United States Patent [19]

Marshall et al.

[11] 4,021,300

[45] May 3, 1977

[54] IMPROVED NUCLEAR FUEL ASSEMBLY GRID SPACER

[75] Inventors: John Marshall, San Jose; Samuel Kaplan, Los Gatos, both of Calif.

[73] Assignee: The United States of America as represented by the United States Energy Research and Development Administration, Washington, D.C.

[22] Filed: May 23, 1975

[21] Appl. No.: 580,498

[52] U.S. Cl. .................................. 176/78; 176/76
[51] Int. Cl.² ...................................... G21C 3/30
[58] Field of Search ............... 176/78, 73, 75, 76, 176/81; 248/358 R, 358 AA

[56] References Cited

UNITED STATES PATENTS

| | | | |
|---|---|---|---|
| 3,679,547 | 7/1972 | Warberg | 176/76 |
| 3,746,617 | 7/1973 | Iwao | 176/76 |
| 3,751,335 | 8/1973 | Keith | 176/78 |
| 3,764,471 | 10/1973 | Rinley | 176/78 |

FOREIGN PATENTS OR APPLICATIONS

| | | | |
|---|---|---|---|
| 1,514,110 | 9/1969 | Germany | 176/78 |
| 992,021 | 5/1965 | United Kingdom | 176/78 |

Primary Examiner—Verlin R. Pendegrass
Assistant Examiner—Donald P. Walsh
Attorney, Agent, or Firm—Dean E. Carlson; Roger S. Gaither; L. E. Carnahan

[57] ABSTRACT

An improved fuel assembly grid spacer and method of retaining the basic fuel rod support elements in position within the fuel assembly containment channel. The improvement involves attachment of the grids to the hexagonal channel and of forming the basic fuel rod support element into a grid structure, which provides a design which is insensitive to potential channel distortion (ballooning) at high fluence levels. In addition the improved method eliminates problems associated with component fabrication and assembly.

9 Claims, 25 Drawing Figures

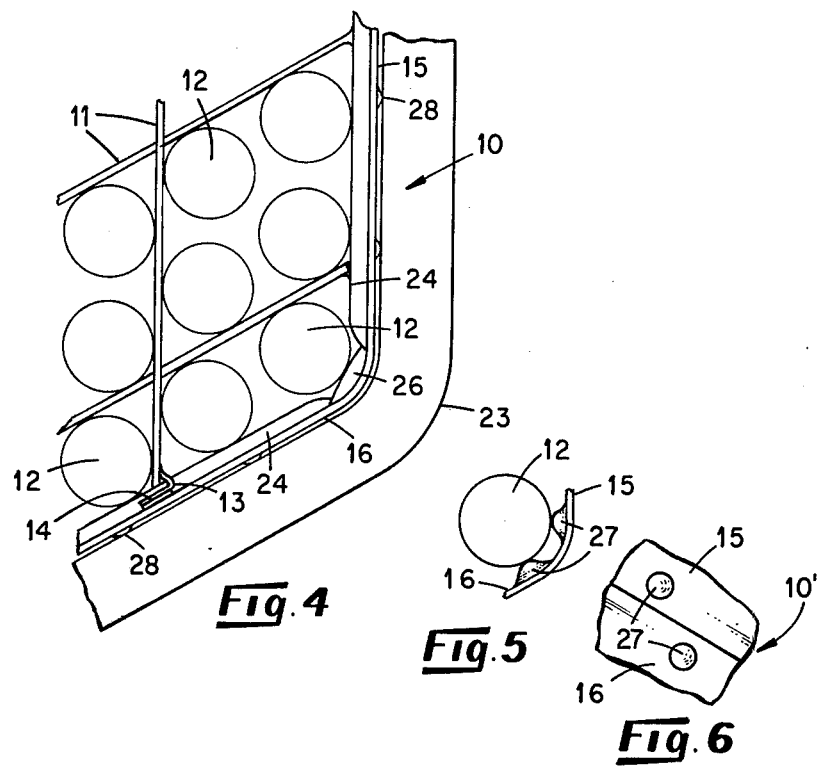
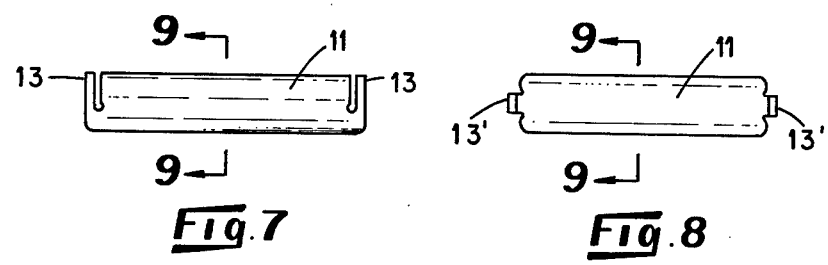
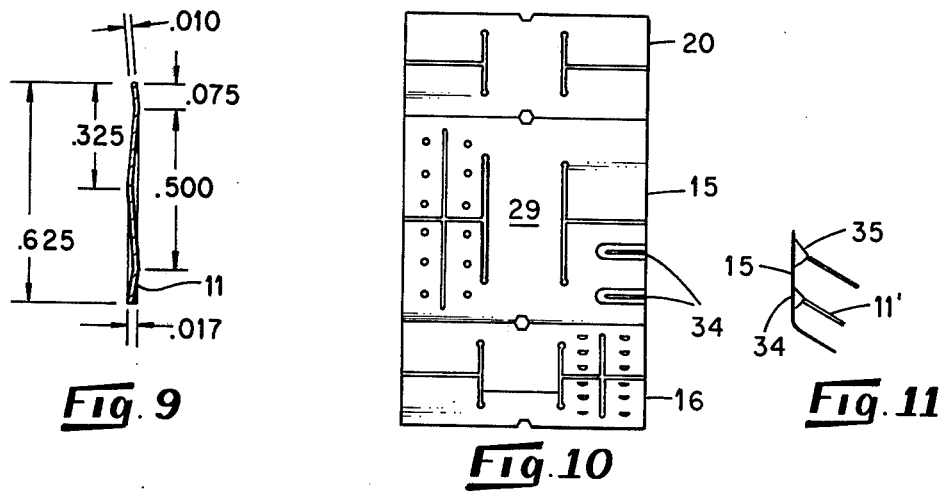

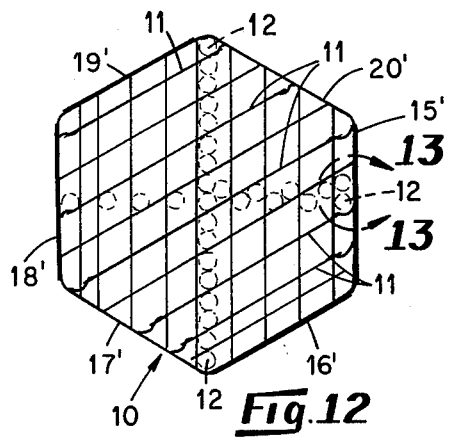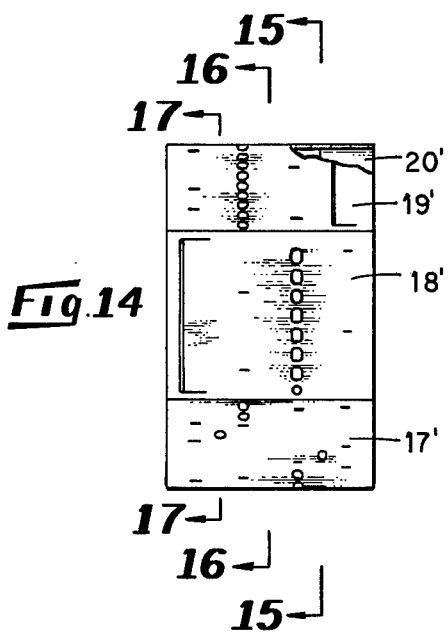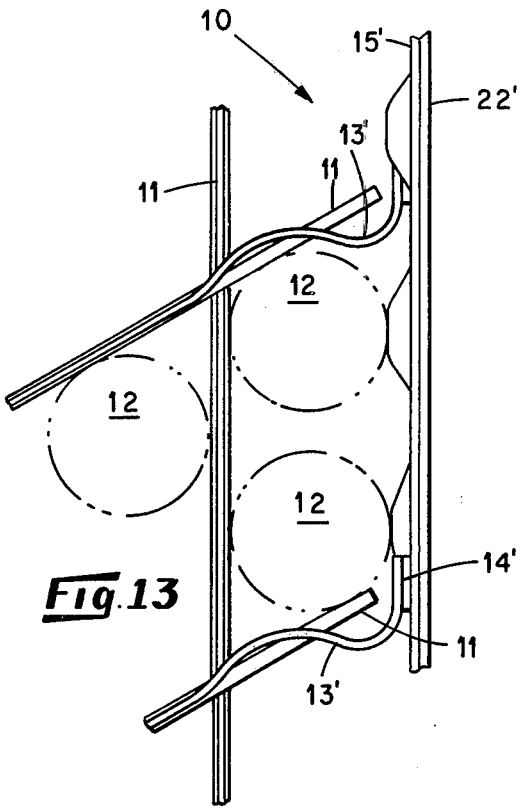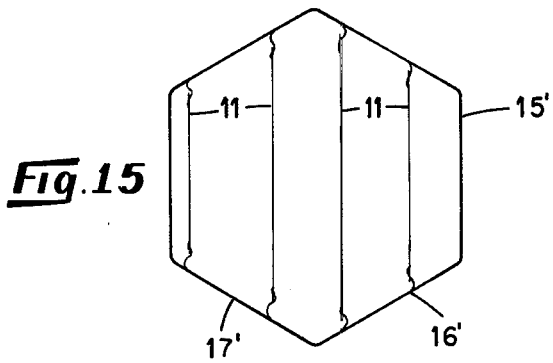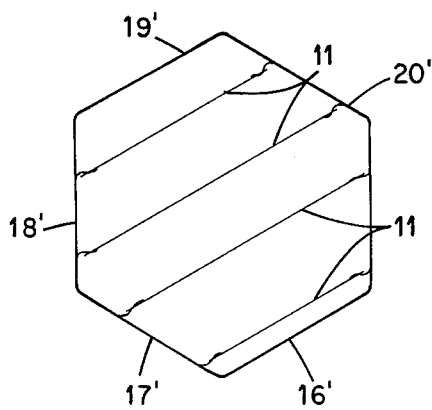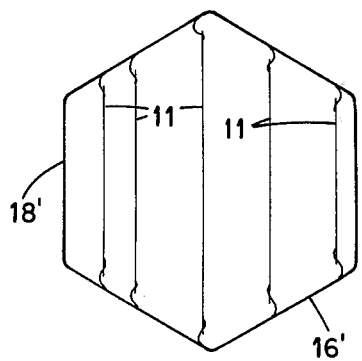

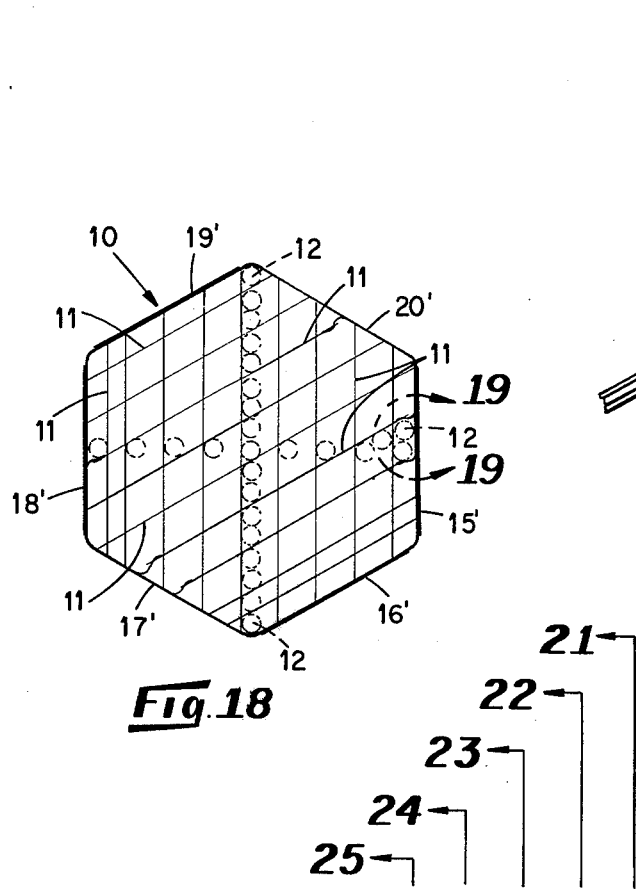
Fig. 18
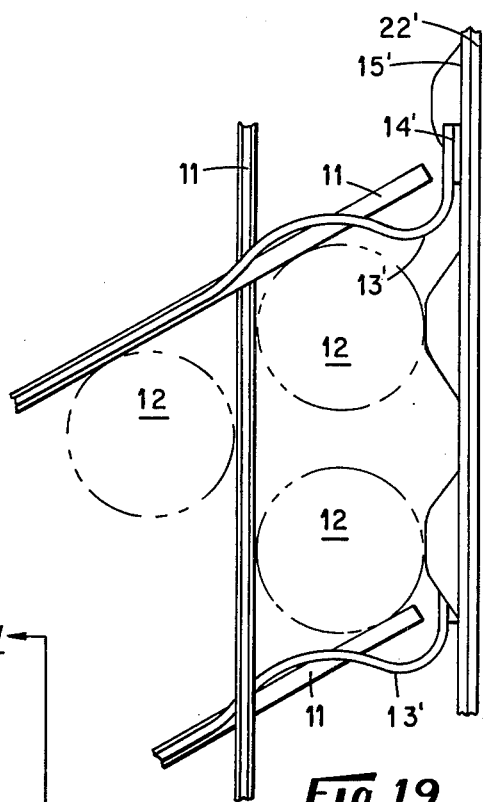
Fig. 19
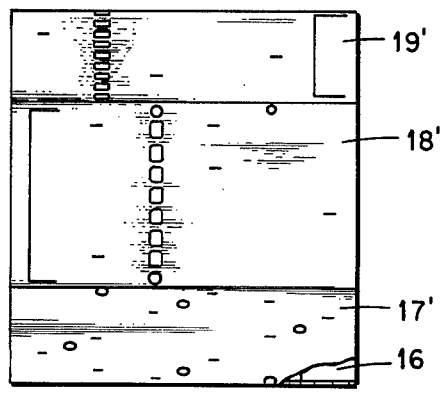
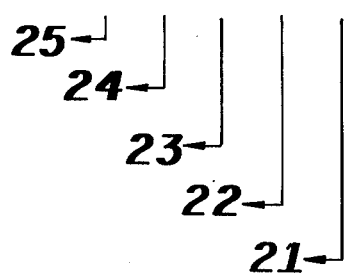
Fig. 20

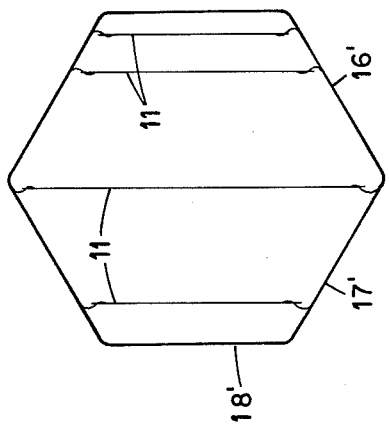
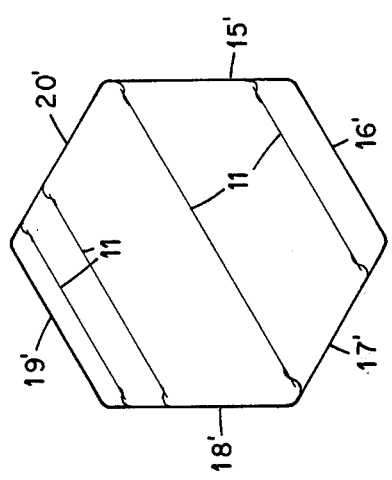
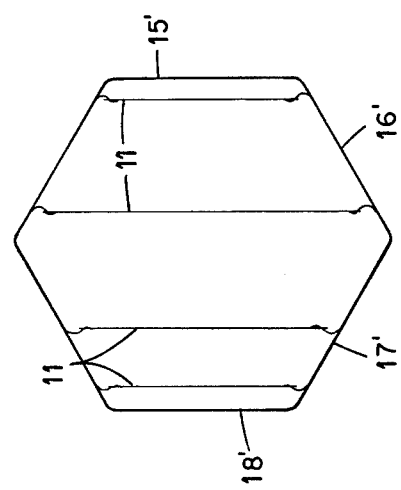
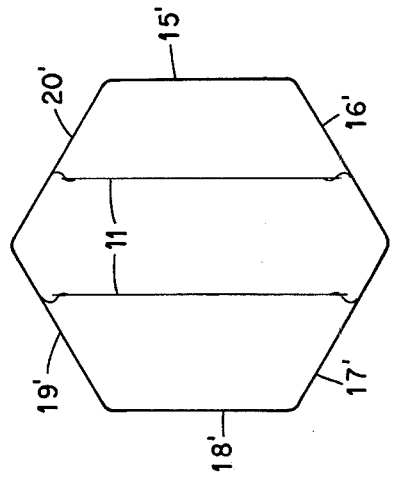
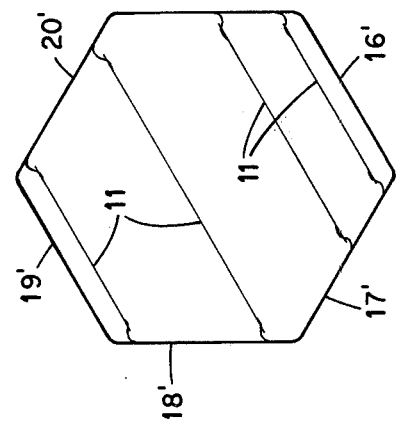

IMPROVED NUCLEAR FUEL ASSEMBLY GRID SPACER

The invention described herein was made in the course of, or under, Contract No. AT(04-3)-893, Task 11, with the United States Atomic Energy Commission.

BACKGROUND OF THE INVENTION

This invention relates to liquid metal fast breeder reactors, and more particularly to an improved grid spacer for such reactors.

Nuclear chain fission reactions and the reactors in which they take place are now well known. A typical reactor includes a chain reacting assembly or reactor core composed of fuel assembly containing an array of spaced fuel rods contained in a tubular coolant flow channel. The fuel rods are quite long compared to their diameters and therefore one or more spacers are provided to prevent bowing of the fuel rods and to maintain them in the desired array.

Such spacers are subject to conflicting design objectives. The spacer must have sufficient strength to limit fuel rod bowing and vibration and to resist severe thermal and hydraulic forces. It must provide sufficient contact area with the fuel rods to minimize local fretting damage to the fuel rod cladding at the points of contact. It must accommodate fuel rod swelling and it must allow fuel rod insertion without damage. The spacer should require, on the other hand, a minimum of material to minimize parasitic neutron absorption. It should be designed to minimize restriction of coolant flow through the channel and it should be adapted to fabrication from low-neutron absorption materials, such as zirconium and stainless steel, which are difficult to fabricate in complex shapes. In addition it should be structurally adequate without dependence upon critical fabrication processes.

Various types and designs of fuel rod spacers have been proposed. U.S. Pat. No. 3,350,275, for example, illustrates a spacer for water cooled reactors having fuel bundles in the order of 49 fuel rods of a diameter of about 0.5 inch and a length of about 12 feet, the spacer being an egg-crate like arrangement of dividers supported by a peripheral band and separate springs to maintain the fuel rods in position and to accommodate fuel rod expansion.

Such spacers are not well-suited for use in sodium cooled fast breeder type reactors wherein each fuel bundle may contain as many as 750 closely spaced fuel rods of 0.25 inch or less in diameter. In such a bundle there is insufficient room for separate springs of practical and reliable design. Prior efforts to provide spacers for the fast breeder reactor core are exemplified by U.S. Pats. Nos. 3,764,471 and 3,806,410, each issued in the name of C. C. Ripley, which further simplify the structural design while providing the necessary spacing and support for the long length, small diameter fuel rods involved.

In liquid metal fast breeder reactors (LMFBR), grid spaced fuel assemblies, such as above-mentioned U.S. Pat. No. 3,764,471, have certain inherent advantages over wire-supported or wire-wrapped rod assemblies. Therefore, grid spacer technology is being developed in order to capitalize these advantages.

One of the most critical problems in grid spacer technology lies in the support of the spacer grids within the fuel channel. Grids are usually supported at discrete intervals along the length of the channel, either by direct attachment to the channel wall or by attachment to a skeletal rod structure within the channel. The former method is much more attractive than the latter in that it allows the maximum number of fuel rods, giving a more economic use of the volume within the channel.

A further requirement of the attachment system is that it shall accommodate the relative growth between the grid and the channel due to metal swelling, and a displacement of the channel walls due to the action of internal pressure and irradiation induced creep; the so-called ballooning effect. This latter effect makes the design of the grid attachment system particularly challenging since it must be designed to accommodate the ballooning and resist the cyclic friction load imposed by the fuel rods on the grids during reactor transient operating conditions.

The main problem facing the designer of grid spacers for the LMFBR is lack of information as to the degree of ballooning which might be expected in a given system inasmuch as the first LMFBR demonstration plant is under development and thus no test data from an actual plant of this type is available. Also, at this time there is no available test data on materials irradiated to the fluence levels required for LMFBR core components. Accordingly, development efforts are being carried out based on tests carried out in the fast test reactor (FTR), computer models, and codes which in the past have been comparative to actual test data, and thus enables development efforts to proceed pending actual tests.

The previously proposed grid spacer assembly design for the LMFBR (hereinafter referred to as the "reference" design) is based upon mechanical attachment to the channel wall. The ends of each beam of the bi-planar line-of-sight grid are formed into locking tabs which engage with recesses formed on the inside of the channel wall. The recess depth must be selected such that the tab engagement is maintained under irradiation conditions, and such that it does not undermine the structural integrity of the channel wall. This prior design suffers from several disadvantages as follows:

1. It is sensitive to uncertainties in swelling and creep correlations for the reference material. This makes the degree of channel ballooning,, and therefore, the design margin against grid dislodgement, uncertain.

2. Current swelling and creep correlations show that the design becomes invalid at LMFBR fluence levels with the reference material.

3. The design is sensitive to channel and grid component fabrication tolerances. This introduces an uncertainty in that fast test reactor (FTR) hex channels have not yet been produced on a production basis, and the tolerances required by the design might not be attained.

4. The insertion of grid spacers into the channel by plastically deforming the spacer beams, by rotation about the welds, presents assembly problems.

5. It is necessary to inspect grids within a fully assembled bundle to ascertain that lock tabs have remained engaged with recesses during assembly of the fuel rods. There is considerably uncertainty involved within the current X-ray techniques which could give rise to quality assurance (QA) problems.

6. The forming of recesses within a hex channel is a very expensive operation involving risk of spoiling fully processed channels.

SUMMARY OF THE INVENTION

The present invention is directed to an improved LMFBR fuel assembly grid spacer which overcomes the above-identified disadvantages of the previously proposed grid spacer. The improvement relates mainly to the attachment of the grids to the hexagonal channel, and to forming the basic fuel rod support element (line-of-sight wave beam) into a grid structure. The improved grid spacer particularly is insensitive to potential channel distortion (ballooning) at high fluence levels, while eliminating prior problems associated with component fabrication and assembly of fuel assembly grid spacers.

The grid spacer retains the basic fuel rod support element of the above-described previously proposed grid spacer, i.e., the line-of-sight wave beam. However, the method of constructing the prior grid from basic wave beams (formerly by projection welding two beam layers at the edges to form a bi-planar construction), and of retaining the grids within the hexagonal channel, is completely different.

Therefore, it is an object of the invention to provide an improved fuel assembly grid spacer for liquid metal cooled fast breeder reactors (LMFBR).

A further object of the invention is to provide an improved LMFBR fuel assembly grid spacer consisting of thin walled cans with wave beams in a staggered pattern fixed to the can.

Another object of the invention is to provide a fuel assembly grid spacer which is insensitive to potential distortion (ballooning) at high fluence levels.

Another object of the invention is to provide an improved method for producing a fuel assembly grid spacer involving the attachments of the grids to the hexagonal channel, and for forming the fuel rod support element or wave beam into a grid structure.

Other objects of the invention will become readily apparent from the following description and accompanying drawings.

BRIEF DESCRIPTION OF THE DRAWINGS

FIG. 4 is an enlarged top view of a corner section of the FIG. 1 grid spacer;

FIGS. 5 and 6 are top and side views respectively of an alternate corner configuration to that shown in FIG. 4;

FIG. 7 is a view of a wave beam with tabs unbent;

FIG. 8 is a view of an optional wave beam;

FIG. 9 is an enlarged cross-sectional view taken along the lines C—C of FIGS. 7 and 8;

FIG. 10 is a side view similar to FIG. 2 illustrating optional details;

FIG. 11 is a partial side view of FIG. 10;

FIG. 12 is a top view of an embodiment of the thin-walled grid spacer, similar to the FIG. 1 embodiment, but utilizing four staggered beam layers;

FIG. 13 is an enlarged view of a section of the FIG. 12 embodiment;

FIG. 14 is a side view of the FIG. 12 embodiment;

FIG. 14a, 14b, and 14c are cross-sectional views taken along the lines A—A, B—B, and C—C, respectively of FIG. 14;

FIG. 15 is a top view of a six staggered beam layer embodiment of the grid spacer made in accordance with the invention;

FIG. 16 is an enlarged view of a section of the FIG. 15 embodiment;

FIG. 17 is a side view of the FIG. 15 embodiment; and

FIGS. 17a–17e are cross-sectional views taken along the lines A—A, B—B, C—C, D—D and E—E, respectively, of FIG. 17.

DESCRIPTION OF THE INVENTION

Figure 1:
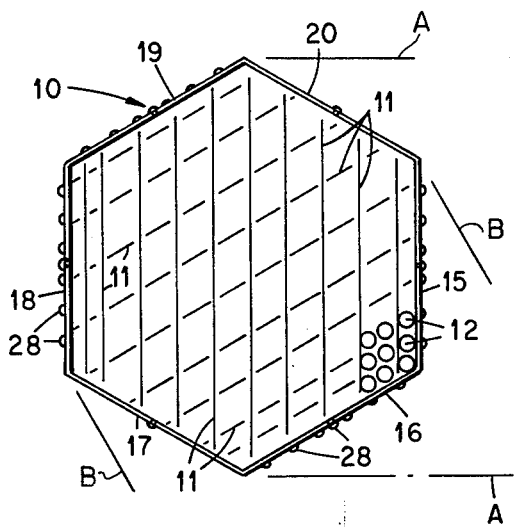
FIG. 1 is a top view of a two beam layer hexagonal grid spacer can made in accordance with the invention.

The improved LMFBR fuel assembly grid spacer, described hereinafter, retains, as pointed out above, the basic fuel rod support element of the previously proposed grid spacer, i.e., the line-of-sight wave beam. However, the method of constructing the grid from basic wave beams (formerly by projection welding two beam layers at the edges to form a bi-planar construction), and of retaining the grids within the hexagonal channel, is completely different.

Broadly, the grid spacer of the present invention consists of a contiguous stacking of assemblies consisting of thin walled cans with wave beams in a staggered pattern fixed to the can. The two wave beam layers of the staggered grid in each can are not projection welded to each other but are separated by approximately one and onehalf inches and are individually attached to the can by welding, or as an alternative, by a non-welded, mechanical locking. The wave beams are welded with the edges flush with the can edge to provide a path for the transfer of load between cans and to help maintain the shape of the cans where the cans interact under stacking loads. It is assumed that loads may stack between cans even if a slight clearance is arranged at assembly. A ratchetting effect such as created during thermal cycling could cause such loads. The stacking loads will be transferred along the corners of the cans, where the "hard points" due to the corner configuration attract the load in combination with the compressive strength provided by the corner that enables the load to be supported. At this phase of the grid spacer design development the axial loading of the cans is considered to be the most significant problem. In addressing this problem, it has been assumed that the loads, which arise from friction between the rods and the grids are minimized by providing as much elimination of restraints within the spacer design as possible. This was one of the reasons for eliminating the projection welds between beam layers, and a motivation for considering a non-welded "floating" attachment as an alternative to welding the wave beams to the cans, as described hereinafter.

As also shown hereinafter, consideration has been given to welding some or all of the cans to the channel at the stacked axial spacing. This would provide a redundant means of axial support. The welding of the cans to the channel is merely a provision for the possibility that high interaction loads may develop between cans during operation of the reactor. It is a back-up position which would detract from some of the assembly advantages of the design. These high loads are not, in fact, expected to develop, but only testing will provide proof of this. The design features of the cans which provide independence of the channel tolerance and ballooning characteristics also may allow the can to be welded to the channel without being compromised by tolerances and ballooning.

Referring now to the drawings, the grid spacer comprises a hollow hexagonal can, grid support, or tubular member 10 having a wall thickness of about 0.015 inch and constructed of stainless steel, for example, and containing therein two layers of staggered or criss-crossed wave beams 11 constituting the basic fuel rod 12 support or spacing elements (see FIG. 4). As pointed out above, the wave beam layers are separated by approximately one and one-half inches and the wave beams 11 are individually attached to the can 10 such that the opposite edges of the wave beam layers are flush with the corresponding can edge or ends to provide the load transfer path betwen cans as above described. As more clearly seen in FIG. 4, the ends or tabs 13 of the wave beams 11, illustrated in detail in FIGS. 7-9, are bent approximately 90° and resistance spot welded to the can 10, as indicated at 14, such that the wider surface of the wave beams are positioned in a parallel position with respect to the interior wall surface of the can.

Tubular can or grid support 10 is composed of six (6) flats or sections 15, 16, 17, 18, 19, and 20 secured together along approximately one-half of the edge surface thereof as indicated at 21 by weld beams. Note from FIGS. 2 and 3 that each of flats 15-20 are provided with a pattern of dimples and slits, described in detail hereinafter, and that the pattern on one flat is different from that on the two adjacent or joining flats and similar to the flat on the opposite side of the can. For example, flats 15 and 18 have a downward cone-like pattern while flats 16 and 19 have an upward cone-like pattern, with flats 17 and 20 having a different pattern configuration. The can 10 is positioned in a channel 22 having a corner 23 which conforms to the intersection of flats 15 and 16 as seen in FIG. 4. An edge rod support ridge 24 (only two shown) is secured to the interior surface of each of flats 15-20 at a point below the upper layer of wave beams 11 and above the lower layer of wave beams, and as seen in FIG. 4 abut against the outer fuel rods 12. A corner support 26 (only one shown) is secured within can 10 intermediate the ends of edge rod support ridges 24, which as pointed out above, functions for load transfer due to the stacked cans 10, as well as providing support for the corner fuel rod 12.

FIGS. 5 and 6 illlustrate an alternate corner design of can 10 wherein the corner support 26 is replaced by a plurality of nesting dimples 27 (two shown) forming in flats 15' and 16' adjacent the adjoining edges thereof, which function to support the fuel element 12.

Each of flats 15-20, of can or tubular member 10, is provided with a selected pattern of dimples 28. In flats 15-20 the dimples 28 are positioned to define a vertical row while in flats 15, 16, 18 and 19 the dimples additionally define horizontal rows as shown. The can outer dimension across flats 15-20, except at the various dimples 28 is 4.310 inches, for example. This provides a nominal clearance, with a nominal size channel 22, of 0.025 inches between the flats and the channel, provided by dimples 28, as can be more readily seen in FIG. 4. Contact between can 10 and channel 22 is made at the middle of each flat 15-20 at can mid-height area 29 by deflecting the spring at the middle of each flat provided by horizontal slits 30 in the flats. The spring consists of deflecting the "clamped beam" by depressing the dimples 28 forming the vertical row between slits 30. The initial fit between the channel 22 and the can dimples 28 will be either an exact fit or with a slight interference for the maximum channel and minimum can across flats (A/F) dimensions. The spring 29 will be initially deflected slightly outward so that an undersized channel will not deflect the spring into the edge distance between the rods and the grid support or can. The vertical slits 31 at each mid-flat at the top and bottom of the can flats 15-20 allows slight "breathing'-'mode displacements when the springs 29 deflect. Very slight closing of the slit wall will occur (approximately zero to several mils) as it is a "second order" response to the spring bending deflections. The purpose of horizontal slits 32 in certain of the can flats is to disrupt continuity which might undesirable distortions in the portions of the can which hold the grid wave beams 11, while the springs 29 deflect inward or outward. The springs 29 could be welded, as indicated at 33, to the channel 22 in lieu of dimpling. A restrictive consideration to this welding feature, other than the problem of welding the thin can layer (0.015 inch) to the considerably thicker channel wall, is the degree of ballooning of the channel 22. For very large deflections of the channel, the spring deflection may try to distort the can at the location of the wave beams 11.

Edge beams, such as used in the above-referenced prior proposed device are used in the present grid spacer. The edge beams will be replaced by deforming the appropriate flat in such a manner as to give wave beam bending to the flat. The deforming consists of dimples 28 on the channel sides and the continuous ridge or edge rod support 24 on the bundle side (see FIG. 4), the ridge being selected as it provides a more stable bearing restraint to the fuel rods 12, the dimples being selected for the channel side as it is believed that dimples will induce less distortion than using all ridges. Additional edge rod restraint against bowing can be provided by simulating wave beams at each edge of a beam layer by providing needed ridges and dimples. The can 10 shape is maintained at other surfaces by the wave beam attachments 14. A nominal fit between the across flats outer dimension of the edge beam simulation dimples and the channel has not been rigorously established. Currently an exact fit of the can nominal outer dimension and channel nominal inner dimension is considered the above-described reference design.

As seen in FIGS. 7-9, the wave beams 11 have an "apparent"thickness, i.e., the planar projection which goes from wave crest to wave crest, of 0.017 inches. This compares to the 0.20 inches for the prior proposed (reference) design, with other dimensions of the wave beam 11 by way of example being shown in FIG. 9. This will allow approximately the same clearance between the fuel rod and the cell as exists in the "reference" design (two mils in the can design compared to 1.6 mils in the reference design). The decreased "apparent"-thickness results from a smaller fuel rod triangular pitch, which, in turn, was necessitated by the space required about the edge of the assembly for the can 10. It is believed that by not projection welding the two wave beam layers together with the beams will act more flexibly, thus considerably reducing rod/grid friction. The welds would allow very small tolerance and lack of straightness effects to considerably influence the tightness of the bundle by the high degree of structural indeterminacy it imposes on the grid spacer mechanics.

The effort to minimize friction, which has been emphasized in the above discussion of the wave beam, serves a dual purpose. One purpose is a requirement imposed by the design itself whereby it is desirable to minimize axial compressive loads between cans. The other purpose is to obtain an advantage over other grid spacer concepts which have greater friction between the rod and grid spacer, as this can potentially limit the performance of the fuel rod because of the wear or galling induced by friction.

The tabs 13 of wave beams 11 (shown unbent in FIG. 7) are welded to the can 10 only locally at its end (see FIG. 4). It is shaped or sized so that it serves as a soft spring to accommodate wave beam to can differential swelling. An alternate non-welded, mechanically captured tab 13' is shown in FIG. 8, and its principal purpose would be to eliminate the requirement for welding, and may also reduce friction by allowing additional lack of restraint. However, as the welding is not considered problematic, it is the preferred choice at this time as it is felt that its fabrication may be less complicated.

Figure 2:
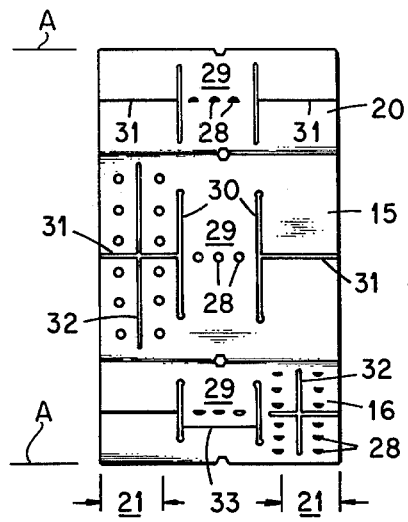
FIG. 2 is a side view of the FIG. 1 grid spacer can taken along the lines A—A.
Figure 3:
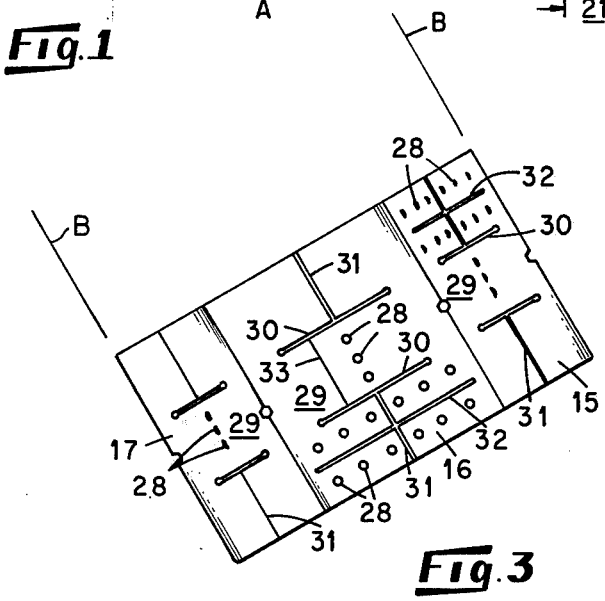
FIG. 3 is a side view of the FIG. 1 grid spacer can overlapping the FIG. 2 side view taken along the lines B—B to illustrate adjacent flats of the hexagonal can.

FIGS. 10 and 11 illustrate a modification of the FIG. 2 can flat by the addition of vertical slots and/or identations 34 in the flats for additional or optional beams 11'. After insertion of the ends or tabs of the wave beams, the slots are welded and/or the indentations filled with weld filler as indicated at 35.

In forming a continuous stack of grid spacer assemblies within the channel, each grid spacer assembly has a different angular orientation from those above and below it in order to obtain the best support characteristics for the rod bundle. Two grid assemblies, made in accordance with this invention, rotated 180° relative to each other have the same number of support points as a prior known "full" grid assembly which does not have staggered beams.

FIGS. 12-14c illustrate a thin-walled grid spacer, described in detail hereinafter, similar to the FIG. 1 embodiment, except that the two layers of beams in FIG. 1 have been further staggered to produce four beam layers. The beams between layers do not make contact at the edges and are separated by a small gap. The incentive for utilizing this configuration is to (a) reduce coolant pressure drop, and (b) further reduce the cumulative fuel rod/grid friction loads. Since pressure drop has been shown to be related to the projected flow area between rods and the supporting wave beams, the additional staggering of beams increases the minimum flow area. In this case the flow area is held constant along the pin bundle, the flow being interrupted only by the crossing of beams from one layer to the next. The additional staggering increase the springiness of the bundle, thereby further reducing friction.

Referring now to the embodiment illustrated by FIGS. 12 to 14c, the components are generally similar to those in FIG. 1 and will be given similar reference numerals, and thus a detailed description thereof is deemed unnecessary. The staggered arrangement of the four layers of beams 11 is clearly seen in FIGS. 12 and 14a-14c, with the beams in every other layer running in a parallel direction and at an angle with respect to the layers adjacent thereto so that looking from the top (FIG. 12) the appearance of the four layers of beams is substantially similar to that of FIG. 1.

It is intended, for example, that the four layer grid assembly of FIG. 12 be used to support the fuel rods over the core region of the reaction. Over the plenum region above the core, where the supports may be less frequent, the four layer grid assembly may be used with suitable spacers between the assemblies or cans which give an average spacing pitch of about one and a half times that over the core region. Alternatively, a triple staggered grid spacer may be used in the plenum region. FIGS. 15-17e illustrate such a grid assembly. As shown, it has six layers of beams but has no more support points over its length than the four layer grid assembly of FIG. 12. The staggered six layer beam arrangement is clearly shown in FIGS. 15 and 17a-17e, again with the beams in every other layer running parallel and at an angle with respect to the beams in the adjacent layers. Inasmuch as the FIG. 15 embodiment is essentially the same as the FIG. 12 embodiment, except for the additional two layers of beams and for the lesser number of beams in each layer, like components will be given like reference numerals.

The grid assemblies, used in conjunction, ensure that pressure drop and rod/grid friction force is completely minimized.

It is noted that in each of the illustrated embodiments that the natural pattern of beams has been interrupted near to the can. Additional beams have been added to give extra support to edge fuel rods which have greater radial temperature gradients than those within the bundle and therefore have greater tendency to bow. This is a further advantage of the design in that additional rod support may be added where necessary.

The principal structure requirement for the herein described grid spacer design is the ability of the stacked cans to withstand the axial compression load. The strength of the can must be provided by the additional strength and stiffness inherent to bent sheet metal at corners. The failure of such structures, which appears as sudden collapse under static load, is referred to as "crippling" and can be analyzed by semi-empirical analytic procedures developed in the aircraft industry where this load carrying mode is common. A crippling load of approximately 2000 pounds was calculated for a can with an 0.005 inch thick wall. This considered elevated temperature effects of reduced modulus of elastically and reduced yield strength, but did not consider creep effects, either irradiation or thermal induced creep. It is believed that adequate strength will exist by decreasing the maximum compression load between cans as follows:

a. relying on the cans which are in the plenum region to be welded to the channel wall at the six mid-flat spacer springs,
 b. considerably decrease in the friction loads because of the elimination in the design of some of the significant structural restraints which generate friction loads.

During the early phase of development, both the allowable load and the friction induced loads will be assessed.

A thermal-hydraulic analysis of the alternate grid spacer design was performed. A computer code was used to predict the axial and radial temperature profiles in a bundle utilizing the previously proposed "reference" grid spacer design. A selected FTR core position was chosen for the analysis, as such position was judged to have the highest coolant temperature and flux level of all the positions being considered.

The bundle edge spacing and pitch-to-diameter (P/D) ratio were varied until the radial temperature profiles of the improved design of this invention approximated the radial temperature profiles of the reference grid design. The results of the analysis are summarized as follows:

FUEL CELL

| | VOLUME FRACTIONS | | | |
|---|---|---|---|---|
| | Fuel | Clad | Structure | Coolant |
| Reference Grid | .3541 | .1142 | .1054 | .4263 |
| Alternate Grid | .3541 | .1142 | .1167 | .4150 |
| Wire-Wrap Design | .3541 | .1142 | .1240 | .4077 |

The key features of the improved grid spacer of this invention discussed in the foregoing description and additional inherent features are outlined as follows:

1. The grid spacer retention within the channel is independent of channel ballooning and is, therefore, not limited by the uncertainties involved in predicting the degree of ballooning.
2. The design is capable of extrapolation to LMFBR fluence levels.
3. It is relatively insensitive to channel and grid fabrication tolerances.
4. The assembly and qualification procedures are simplified.
5. The fabrication costs are greatly reduced.
6. The grid is a fully inspectable component which is not deformed prior to being inserted into the channel.
7. It does not require the channel wall to be machined to retain grids. Therefore, the channel is not structurally weakened.
8. It offers the potential for reduced fuel rod/grid friction forces.

This is an important consideration for assembly fabrication in addition to those for in-service, in that there is less chance of fuel rod clad damage both during assembly and operation.

It has thus been shown that the present invention provides a fuel assembly grid spacer for an LMFBR which overcomes the disadvantages of the prior grid spacers, thus advancing the state of the art.

While particular embodiments of the invention have been illustrated and described, modifications will become apparent to those skilled in the art, and it is intended to cover in the appended claims all such modifications as come within the spirit and scope of the invention.

What we claim is:

1. An assembly for retaining a plurality of fuel rods in spaced, substantially parallel array, comprising a tubular shaped longitudinally extending channel member, at least one thin-walled hexagonal shaped member positioned within said channel member, said hexagonal shaped member being composed of a plurality of flats, each of said flats being provided with a plurality of outwardly extending dimples defining at least a vertically extending row of dimples, and a plurality of vertically extending and horizontally extending slits, a pair of said horizontally extending slits being located in each of said flats to define a deflectable spring-like area therebetween, at least one pair of spaced layers of laterally spaced beams positioned in said hexagonal shaped member, each of said beams being configured to form waves therein, one layer of said laterally spaced beams extending from one flat to another flat of said hexagonal shaped member, another layer of said pair of laterally spaced beams extending from one flat to another flat of said hexagonal shaped member, said second-mentioned layer of laterally spaced beams being in a different plane in spaced apart relation to and extending at an angle with respect to said first-mentioned layer of laterally spaced beams, each of said beams being formed with an extending tab at each end, said extending tabs being bent at an angle with respect to said beams and secured to and flush with an inner surface of said adjacent flats.

2. The assembly defined in claim 1, wherein at least a portion of said outwardly extending dimples in said flats are in contact with said channel member and function in cooperation with said deflectable spring-like area to define a deflectable spring surface between said flats and said channel member.

3. The assembly defined in claim 1, wherein said deflectable spring-like area is located at approximately the middle of each flat and at a mid-height area of each flat.

4. The assembly defined in claim 1, additionally including a rod support ridge extending inwardly from each flat at opposite ends of said flats.

5. The assembly defined in claim 4, additionally including corner support means extending inwardly from said flats and positioned intermediate adjacent rod support ridges.

6. The assembly defined in claim 5, wherein said corner support means constitutes a plurality of spaced nesting dimples.

7. The assembly defined in claim 1, wherein at least a portion of said plurality of outwardly extending dimples in each of said flats are positioned to define said vertically extending row of dimples intermediate said pair of spaced horizontally extending slits.

8. The assembly defined in claim 7, wherein said plurality of outwardly extending dimples additionally define at least one horizontally extendig row of dimples.

9. The assembly defined in claim 1, wherein there are at least two pairs of laterally spaced beam layers positioned in said hexagonal shaped member with every other layer of beams extending in a substantially parallel direction and at an angle with respect to an adjacent layer of beams.

* * * * *